United States Patent
Singh et al.

(10) Patent No.: US 9,578,640 B1
(45) Date of Patent: Feb. 21, 2017

(54) DYNAMIC PROVISION OF HYBRID-ARQ REPETITION FACTOR BASED ON SUBSCRIPTION SERVICE CLASS

(71) Applicant: Sprint Spectrum L.P., Overland Park, KS (US)

(72) Inventors: Jasinder P. Singh, Olathe, KS (US); Maulik K. Shah, Austin, TX (US); Siddharth S. Oroskar, Overland Park, KS (US); Anoop K. Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 85 days.

(21) Appl. No.: 14/717,662

(22) Filed: May 20, 2015

Related U.S. Application Data (62) Division of application No. 14/041,885, filed on Sep. 30, 2013, now Pat. No. 9,071,431.

(51) Int. Cl.
*H04B 7/00* (2006.01)
*H04W 72/04* (2009.01)
*H04L 5/00* (2006.01)
*H04L 1/18* (2006.01)
(Continued)

(52) U.S. Cl.
CPC ........ *H04W 72/0446* (2013.01); *H04L 1/1812* (2013.01); *H04L 5/0007* (2013.01); *H04L 5/0055* (2013.01); *H04W 72/042* (2013.01); *H04W 84/042* (2013.01); *H04W 92/10* (2013.01)

(58) Field of Classification Search
CPC .. H04W 88/12; H04W 72/04; H04W 72/0433; H04W 28/02; H04W 28/10; H04W 28/12; H04W 36/0055; H04W 52/325; H04W 72/005; H04W 72/082; H04W 84/18; H04W 88/02; H04W 88/08; H04W 92/045; H04W 92/12
See application file for complete search history.

(56) References Cited

U.S. PATENT DOCUMENTS

| | | |
|---|---|---|
| 7,848,238 B1 | 12/2010 | Pawar et al. |
| 7,978,626 B1 | 7/2011 | Khanka et al. |
| 8,040,803 B1 | 10/2011 | Pawar et al. |

(Continued)

OTHER PUBLICATIONS

ETSI TS 136 213 V10.1.0 (Apr. 2011) LTE; Evolved Universal Terrestrial Radio Access (E-UTRA); Physical layer procedures (3GPP TS 36.213 version 10.1.0 Release 10).*

*Primary Examiner* — Ronald Eisner (57) ABSTRACT

Disclosed is a method and corresponding apparatus to make use of hybrid-ARQ repetition factors as a way to differentiate service quality to various mobile terminals. Depending on a mobile terminal's subscription service class, such as the mobile terminal's PLMN, the mobile terminal may be made to use a particular hybrid-ARQ repetition factor. For instance, a mobile terminal of a high service class may be made to use a low hybrid-ARQ repetition factor, which may help the mobile terminal experience less downlink transmission delay and thus a higher downlink data rate. Whereas, a mobile terminal of a low service class may be made to use a high hybrid-ARQ repetition factor, which may cause the mobile terminal to experience more downlink transmission delay and thus a lower downlink data rate, and may further free up downlink transmission resources to facilitate better service for other mobile terminals.

14 Claims, 7 Drawing Sheets

(51) Int. Cl.
*H04W 84/04* (2009.01)
*H04W 92/10* (2009.01)

(56) References Cited

U.S. PATENT DOCUMENTS

| | | |
|---|---|---|
| 8,051,200 B1 | 11/2011 | Pawar et al. |
| 8,107,438 B1 | 1/2012 | Singh et al. |
| 8,204,000 B1 | 6/2012 | Srinivas et al. |
| 8,245,088 B1 | 8/2012 | Srinivas et al. |
| 8,570,967 B1 | 10/2013 | Pawar et al. |
| 8,781,500 B1 | 7/2014 | Dekel |
| 8,817,695 B1 | 8/2014 | Rai et al. |
| 2007/0150787 A1* | 6/2007 | Kim .................. H04L 1/1858 714/748 |
| 2008/0273520 A1 | 11/2008 | Kim et al. |
| 2009/0327443 A1 | 12/2009 | Pawar et al. |
| 2013/0090124 A1 | 4/2013 | Panchal et al. |

* cited by examiner

DYNAMIC PROVISION OF HYBRID-ARQ REPETITION FACTOR BASED ON SUBSCRIPTION SERVICE CLASS

REFERENCE TO RELATED APPLICATION

This is a divisional of U.S. patent application Ser. No. 14/041,885, filed Sep. 30, 2013, the entirety of which is hereby incorporated by reference.

BACKGROUND

Unless otherwise indicated herein, the description in this section is not prior art to the claims and is not admitted to be prior art by inclusion in this section.

In a typical cellular wireless communication system, the air interface between a base station and served mobile terminals may define a downlink (or "forward link") for carrying communications from the base station to the mobile terminals and an uplink (or "reverse link") for carrying communications from the mobile terminals to the base station. In various implementations, these links may be defined on or more carrier frequencies or blocks of frequencies. Furthermore, on each link, various channels may be defined through techniques such as time division multiplexing, code division multiplexing, and/or frequency division multiplexing.

In one implementation, the downlink may be divided over time into a continuum of timeslots (i.e., "transmission time intervals" (TTIs)), and the base station or associated equipment may be arranged to transmit data, such as bearer traffic (e.g., user data) and control signaling (e.g., paging and other overhead messages), to mobile terminals in those timeslots. In such an implementation, the base station or associated equipment may dynamically schedule transmission of data in particular timeslots and may then transmit the data according to that schedule.

To help overcome errors that may arise in wireless data transmission, the base station and served mobile terminals may also be arranged to apply a hybrid automatic repeat request (hybrid-ARQ or HARQ) process. In such a process, when the base station is going to transmit a data packet to a mobile terminal, the base station may repeatedly attempt transmission of the packet to the mobile terminal in sequential (e.g., interlaced) timeslots, until the mobile terminal confirms that it successfully received the packet or until the base station completes a maximum number of attempts without receiving such confirmation.

In practice, for instance, the base station may add more error correction with each subsequent attempt and/or may transmit various portions of the packet with various error correction coding in each subsequent attempt, in an effort to have the mobile terminal ultimately receive enough data to constitute or facilitate uncovering the packet as a whole. For example, if the packet payload comprises the elements ABCD, the base station may transmit in a first timeslot the full payload ABCD plus some error correction coding. If that transmission is insufficient to allow the mobile terminal to uncover the payload (e.g., due to errors in the transmission process), the base station may then transmit in a next timeslot a portion of the payload, such as ABC, plus some additional error correction coding. And if that transmission is still insufficient, the base station may then transmit in a next timeslot another portion of the payload, such as BDC, plus more substantial error correction coding. This process may continue until the packet transmission is deemed successful or until a predefined threshold number of timeslots is exhausted (in which case the transmission would have failed).

During this packet transmission process, the mobile terminal may transmit a hybrid-ARQ message to the base station in response to each transmission attempt from the base station. In particular, for each transmission attempt that does not result in the mobile terminal having successfully received or uncovered the complete packet payload, the mobile terminal may transmit to the base station on the uplink a negative acknowledgement (NAK), to prompt the base station to engage in a next transmission attempt. On the other hand, if and when the mobile terminal received and uncovered the complete packet (e.g., the packet transmission and any associated decoding by the mobile terminal was successful), the mobile terminal may then transmit to the base station a positive acknowledgement (ACK), to inform the base station that transmission of the packet was successful, thereby completing transmission of that packet.

Overview

In a representative hybrid-ARQ process, a mobile terminal may be configured to transmit each hybrid-ARQ message (i.e., each ACK or NAK) repeatedly to help ensure that the base station receives the hybrid-ARQ message. In practice, for instance, the mobile terminal may be configured to apply a particular hybrid-ARQ "repetition factor," R, that defines how many times the mobile terminal should transmit each hybrid-ARQ message to the base station. Without limitation, an example of such a repetition factor may be a number from 1 to 4. Thus, for instance, if the repetition factor is 1, the mobile terminal would transmit each hybrid-ARQ message to the base station just once, whereas, if the repetition factor is 3, the mobile station would transmit each hybrid-ARQ message to the base station three times in a row.

When a mobile terminal is configured to apply such a repetition factor, the base station may be configured to wait for a corresponding period of time after each packet transmission attempt to the mobile terminal, before the base station then engages in a next transmission to the mobile terminal. For example, if the repetition factor is 2, the base station may be configured to wait for a period of time corresponding with transmission of two hybrid-ARQ messages from the mobile terminal after each packet transmission attempt from the base station, before the base station then engages in a next transmission to the mobile terminal. Whereas if the repetition factor is 4, the base station may be configured to wait for a period of time corresponding with transmission of four hybrid-ARQ messages from the mobile terminal after each packet transmission attempt from the base station, before the base station then engages in a next transmission attempt to the mobile terminal.

To facilitate this, the uplink may be similarly divided into a continuum of timeslots, and the mobile terminal may be configured to engage in repeat hybrid-ARQ message transmissions in a defined sequence of those timeslots. For instance, the mobile terminal may be configured to transmit a single hybrid-ARQ message per timeslot and to repeat hybrid-ARQ message transmission across a contiguous sequence of timeslots, so that the mobile terminal's repeated transmission with a repetition factor of R would span a period of R timeslots. Assuming each timeslot spans a specific period of time T, such as 1 millisecond for instance, the base station may then be configured to wait for a duration of R×T before the base station then engages in a next transmission attempt to the mobile terminal.

By way of example, given a repetition factor of 3 and a timeslot duration of 1 millisecond, if the base station attempts transmission of a packet to the mobile terminal and the mobile terminal does not successfully receive or uncover the packet payload, the mobile terminal may transmit a NAK to the base station in each of the next three timeslots. In that case, after the base station engages in the transmission attempt to the mobile terminal, the base station would wait a period of three milliseconds before then engaging in a next attempt to transmit that packet to the mobile terminal. Whereas, if the mobile terminal does successfully receive and uncover the packet payload, then the mobile terminal may transmit an ACK to the base station in each of the next three timeslots. And in that case, the base station would wait a period of three milliseconds before then beginning to transmit a next packet to the mobile terminal.

In practice, the use of a hybrid-ARQ repetition factor greater than 1 can help to ensure that the base station receives a mobile terminal's hybrid-ARQ messages. This can be important, as the base station needs to know whether to engage in a re-transmission attempt to the mobile terminal or rather whether to begin transmission of a next packet to the mobile terminal. Particularly if the mobile terminal transmits an ACK and the base station does not successful receive the ACK, the base station may assume that the transmission attempt to the mobile terminal was unsuccessful, and the base station may engage in a next attempt to transmit the same packet, rather than beginning to transmit a next packet.

Unfortunately, however, a downside to using a hybrid-ARQ repetition factor greater than 1 is that the base station will need to wait longer before engaging in a next transmission attempt to the mobile terminal, regardless of whether the next transmission attempt is for the same packet or for a next packet. Consequently, use of a hybrid-ARQ repetition factor greater than 1 may delay data transmission to the mobile terminal and thereby result in the mobile terminal experiencing a reduced downlink data rate.

On the other hand, the delay in base station transmission to a mobile terminal as a result of use of a hybrid-ARQ repetition factor greater than 1 may also free up downlink transmission resources, such as downlink time slots, to be used for other purposes. For instance, if the base station is concurrently serving multiple mobile terminals, during the time that the base station is waiting for repeated hybrid-ARQ transmission from a given mobile terminal, the base station could be engaging in data transmission to one or more other mobile terminals. Thus, use of hybrid-ARQ repetition factor greater than 1 can be beneficial for this reason as well.

Given these considerations, disclosed herein is a method and corresponding apparatus to make use of hybrid-ARQ repetition factors as a way to differentiate service quality to various mobile terminals. In particular, depending on a mobile terminal's service class, the mobile terminal may be made to use a particular hybrid-ARQ repetition factor. For instance, a mobile terminal of a high service class may be made to use a low hybrid-ARQ repetition factor, which may help the mobile terminal experience less downlink transmission delay and thus a higher downlink data rate. Whereas, a mobile terminal of a low service class may be made to use a high hybrid-ARQ repetition factor, which may cause the mobile terminal to experience more downlink transmission delay and thus a lower downlink data rate, and may further free up downlink transmission resources to enable the base station to better serve other mobile terminals.

In practice, a mobile terminal's service class may be defined by the public land mobile network (PLMN) to which the mobile terminal subscribes, possibly in comparison with the PLMN of the serving base station. In this way, for instance, service class differentiation could be provided based on whether a mobile terminal subscribes to the primary PLMN of the serving base station. Further, to the extent different PLMNs are provided for pre-paid subscriptions versus post-paid subscriptions, service class differentiation could likewise be provided based on whether a mobile terminal has a pre-paid subscription or rather a post-paid subscription.

Accordingly, in one respect, disclosed herein is method operable in a wireless communication system in which a RAN serves a mobile terminal over an air interface defining a downlink for carrying data transmissions from the RAN to the mobile terminal and an uplink for carrying hybrid-ARQ messaging from the mobile terminal to the RAN, and in which the mobile terminal has a subscription service class (e.g., a particular PLMN to which the mobile terminal subscribes). The method involves the RAN determining, based at least in part on the subscription service class of the mobile terminal (e.g., based at least in part on the PLMN to which the mobile terminal subscribes), a hybrid-ARQ repetition factor that the mobile terminal should use for the hybrid-ARQ messaging from the mobile terminal to the RAN, and the RAN transmitting over the air interface to the mobile terminal a directive for the mobile terminal to use the determined hybrid-ARQ repetition factor.

In another respect, disclosed is a cellular base station that includes an antenna structure configured to communicate over an air interface with mobile terminals served by the cellular base station, and that further includes a controller configured to provide a directive for a mobile terminal served by the cellular base station to use a particular hybrid-ARQ repetition factor selected based at least in part on a PLMN to which the mobile terminal subscribes. In particular, the controller may be configured (i) to determine the PLMN to which a mobile terminal subscribes, (ii) to determine, based at least in part on the determined PLMN, a hybrid-ARQ repetition factor that the mobile terminal should use for transmission of hybrid-ARQ messages to the cellular base station, and (iii) to provide for transmission by the antenna structure to the mobile terminal a directive for the mobile terminal to use the determined hybrid-ARQ repetition factor for transmission of hybrid-ARQ messages to the cellular base station.

And in still another respect, disclosed is an alternative method that may involve a serving RAN providing a mobile terminal with a message that specifies multiple hybrid-ARQ repetition and correlates each with a respective PLMN, so that the mobile terminal can select and apply one of the specified hybrid-ARQ repetition factors based on the mobile terminal's PLMN. In particular, from the mobile terminal's perspective, the method may involve (i) receiving over the air interface from the RAN a message that specifies a plurality of PLMNs and that specifies, for each PLMN, a respective hybrid-ARQ repetition factor to be used by mobile terminals that subscribe to the PLMN, (ii) referring to the received message to determine, based at least in part on the particular PLMN to which the mobile terminal subscribes, which hybrid-ARQ repetition factor the mobile terminal should use, and (iii) using by the mobile terminal the determined hybrid-ARQ repetition factor when transmitting hybrid-ARQ messaging to the RAN.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Referring to the drawings, as noted above, FIG. 1 is a simplified block diagram of a wireless communication system in which the present method can be implemented. It should be understood that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 1:
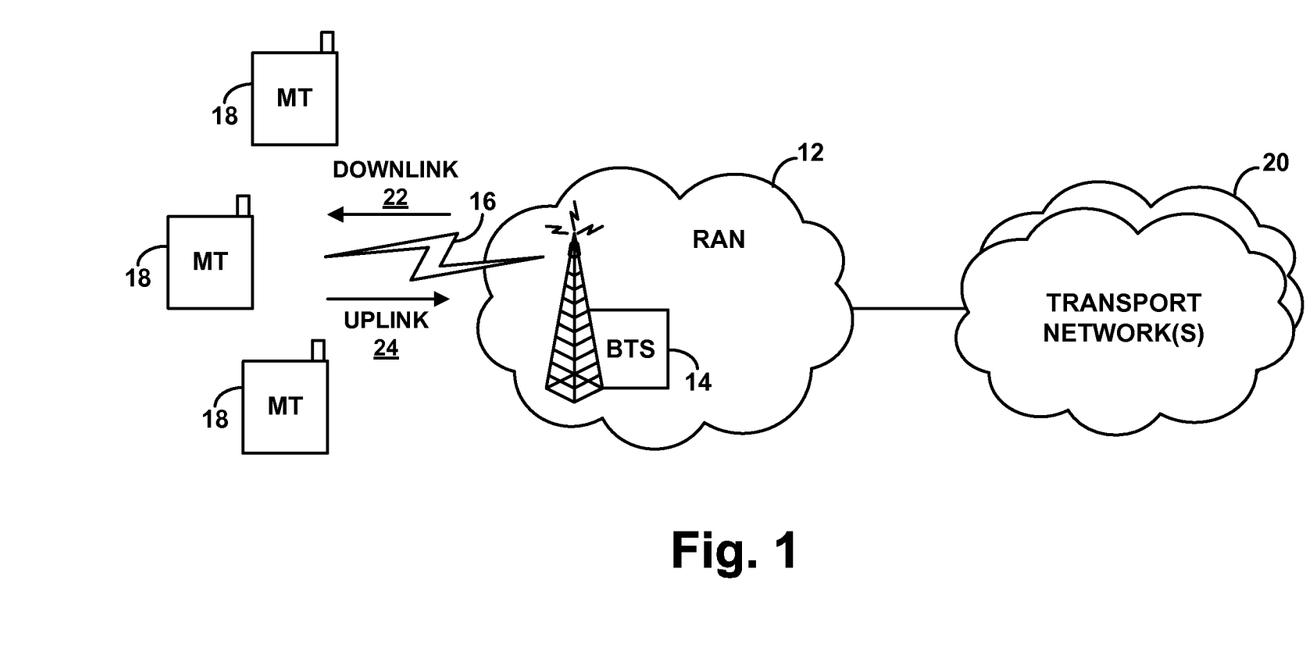
FIG. 1 is a simplified block diagram of a wireless communication system in which the present method can be implemented.

FIG. 1 depicts the example communication system as including at its core a RAN 12 having a base station 14 that radiates to define a wireless air interface 16 through which the base station may communicate with one or more served mobile terminals 18. RAN 12 then provides connectivity with one or more transport networks 20, such as the public switched telephone network (PSTN) or the Internet for instance. With this arrangement, a mobile terminal 18 that is positioned within coverage of the base station and that is suitably equipped may engage in air interface communication with the base station and may thereby communicate with remote entities on the transport network(s) and/or with other mobile terminals served by the RAN.

Figure 2:
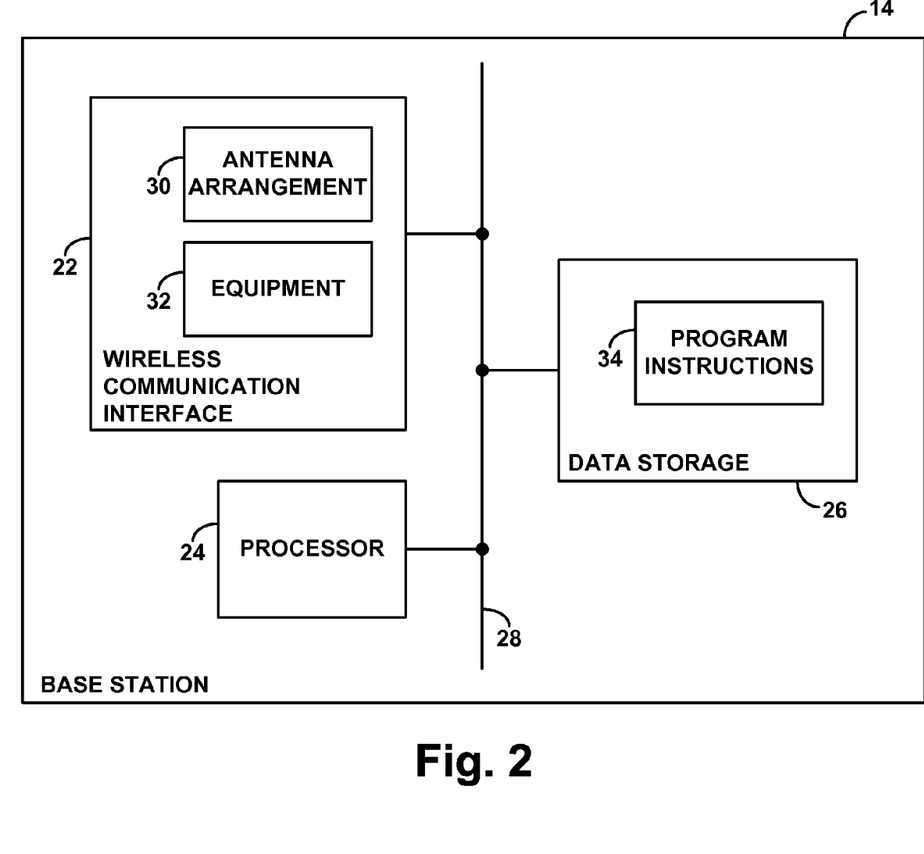
FIG. 2 is a simplified block diagram of a base station operable in the arrangement of FIG. 1.

FIG. 2 is next a simplified block diagram of a representative cellular base station 14, such as a base transceiver station, access node, access point, Node-B, or eNodeB, for instance (whether macro, femto or the like), illustrating some of the components that can be included in such an entity. As shown in FIG. 2, the representative base station may include a wireless communication interface 22, a processor 24, and data storage 26, all of which may be coupled together by a system bus, network or other connection mechanism 28.

As shown, wireless communication interface 22 may comprise an antenna arrangement 30, which may be tower mounted, and associated components such as a cell site modem for engaging in air interface communication with mobile terminals 18, such as to transmit data and control information to the mobile terminals and receive data and control information from the mobile terminals. The antenna arrangement may be of the type and configuration known to be used in cellular base stations.

Processor 24 may then comprise one or more general purpose processors (e.g., microprocessors) and/or special-purpose processors (e.g., digital signal processors and/or application specific integrated circuits) and may be integrated in whole or in part with the wireless communication interface. And data storage 26 may comprise one or more volatile and/or non-volatile storage components and may be integrated in whole or in part with processor 24.

As shown, data storage 26 may hold program instructions 34, which may be executable by processor 24 to carry out various base station or RAN functions described herein. For instance, in accordance with the program instructions, the processor may function to determine a service class, such as a PLMN, of a mobile terminal served by the base station, to select a hybrid-ARQ repetition factor based on the determined service class, and to send a directive to the mobile terminal to cause the mobile terminal to apply the selected hybrid-ARQ repetition factor.

As such, the processor 24 programmed with instructions 34 may define part or all of a controller for controlling operation of the base station 14. Alternatively or additionally, however, such control functionality could be provided external to the base station 14, in another RAN entity such as a radio network controller (RNC), base station controller (BSC), or mobility management entity (MME), for instance, which could be communicatively linked with the base station and could serve to control aspects of base station operation and RAN operation generally.

Figure 3:
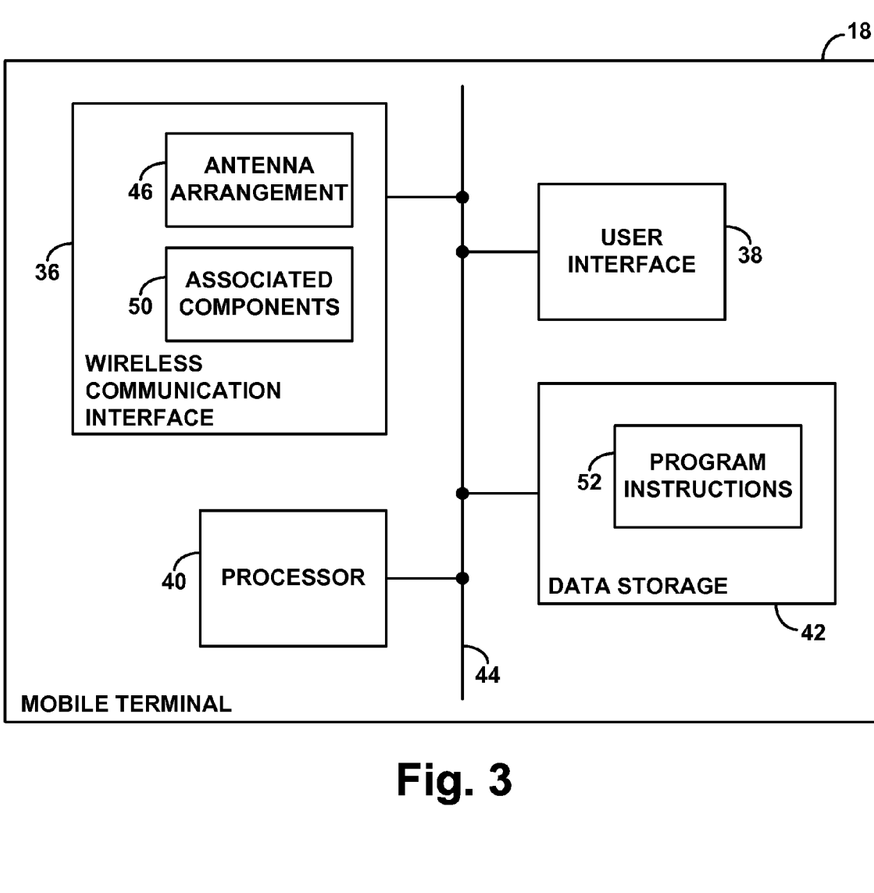
FIG. 3 is a simplified block diagram of a mobile terminal operable in the arrangement of FIG. 1.

FIG. 3 is next a simplified block diagram of a representative mobile terminal 18 (also possibly referred to as user equipment, an access terminal, a wireless communication device, or the like), such as a cellular telephone, wirelessly equipped tablet or personal computer, embedded wireless communication module, for instance, illustrating some of the components that can be included in such a device. As shown, the representative mobile terminal may include a wireless communication interface 36, a user interface 38, a processor 40, and data storage 42, all of which may be coupled together by a system bus, network, or other connection mechanism 44.

Wireless communication interface 36 may comprise an antenna arrangement 46 and associated components 50 such as mobile station modem for instance, for engaging in communication with serving base stations such as base station 14, such as to transmit data and control information to the base stations and to receive data and control information from the base stations.

User interface 38 may then facilitate interaction with a user of the mobile terminal if applicable. As such, the user interface may include output components such as a display screen, loudspeaker, and headphone jack, and input components such as a keypad, a touch-sensitive screen, and a camera.

Processor 40 may then comprise one or more general purpose processors and/or special-purpose processors and may be integrated in whole or in part with wireless communication interface 36. And data storage 42 may comprise one or more volatile and/or non-volatile storage components and may be integrated in whole or in part with processor 40.

As shown, data storage 42 may hold program instructions 52, which may be executable by processor 40 to carry out various mobile terminal functions described herein. For instance, in accordance with the program instructions, processor 40 may function to evaluate data transmissions from base station 14, to transmit hybrid-ARQ messaging to the base station. Further, processor 40 may function to receive from the base station a directive to use a particular hybrid-ARQ repetition factor based on the mobile terminal's service class, such as its PLMN, and to apply that hybrid-ARQ repetition factor.

In practice, the RAN 12 and mobile terminals 18 may be arranged to communicate with each other over the air interface 16 according to one or more agreed air interface protocols, examples of which include Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1xRTT or 1xEV-DO), Global System for Mobile Communication (GSM), WIFI, BLUETOOTH, and/or other protocols now known or later developed.

As shown in FIG. 1, the air interface defines a downlink 22 that carries wireless communications from the RAN to the mobile terminals and an uplink 24 that carries wireless communications from the mobile terminals to the RAN. Depending on the protocol, these links may be structured in various ways. At a high level, for instance, the base station 14 may provide service on one or more frequency channels or bands, with downlink communications occupying one band and uplink communications occupying another band. Alternatively, downlink and uplink communications may be carried out on a common frequency band and may be differentiated through time division multiplexing and/or other techniques.

As noted above, the downlink and uplink may each be divided over time into a continuum of timeslots for carrying data such as bearer traffic and/or control signaling (among perhaps other segments of time set aside for other purposes). In practice, these timeslots may be defined in various ways, and the structure of the downlink may be the same as or different from that of the uplink.

Under a current version of LTE, for instance, the downlink and uplink are each divided into a continuum of 10 millisecond frames, and each frame is further divided into ten 1 millisecond subframes. Each subframe is then considered a TTI for carrying air interface communications. Furthermore, LTE advantageously divides the available frequency bandwidth on the downlink and uplink into a number of subcarriers for carrying air interface communications, and groups of those subcarriers in each TTI define "resource blocks" for carrying air interface communications, with the number of resource blocks per TTI depending on the available bandwidth.

Furthermore, the downlink and uplink may each define various channels for carrying particular types of communications between the base station and mobile terminals. For instance, each timeslot may be divided into (i) one or more control channel segments for carrying control signaling between the base station and mobile terminals and (ii) one or more bearer channel segments for carrying bearer data between the base station and mobile terminals. In an LTE air interface, for instance, these channels may be defined generally in each TTI or more specifically in each resource block.

In practice, the base station or associated network infrastructure may be configured to schedule transmissions of data to mobile terminals in these timeslots. For instance, as the base station receives data to transmit to a mobile terminal, the base station may buffer the data and then transmit to the mobile terminal a control message that specifies the timeslot, and for a protocol such a LTE, the specific resource block(s), in which the base station will transmit the data to the mobile terminal. The base station may then transmit the data to the mobile terminal as specified. Further, the base station may be configured to apply a hybrid-ARQ process as discussed above, engaging in a sequence of attempts to the mobile terminal for each data transmission until the base station receives an ACK from the mobile terminal or the base station finishes the sequence of attempts without receiving an ACK from the mobile terminal.

Each mobile terminal may then likewise be configured to receive such assignments of timeslots (e.g., resource blocks) from the base station and to receive data transmitted to the mobile terminal from the base station in accordance with those assignments. Further, each mobile terminal may likewise be configured to apply a hybrid-ARQ process as discussed above, determining for each data transmission from the base station whether the mobile terminal successfully receives and uncovers the data transmitted, and transmitting either an ACK or NAK to the base station accordingly. In practice, for instance, a mobile terminal may transmit a NAK if the mobile terminal does not receive a transmission that was scheduled to be provided to the mobile terminal, or if the mobile terminal was unable to uncover (e.g., decode) the underlying payload of the transmission. Whereas, the mobile terminal may transmit an ACK if the mobile terminal successfully receives the transmission and uncovers the underlying payload.

As discussed above, mobile terminals may further be configured to apply a hybrid-ARQ repetition factor that defines how many times in a row to transmit each hybrid-ARQ message. In line with the example above, for instance, the repetition factor may range from 1 to 4. Further, in line with the discussion above, mobile terminals may be configured to provide such repeated transmissions in a series of TTIs, such as by including each transmission of the hybrid-ARQ message in a respective TTI. Consequently, as discussed above, the time that it takes for a mobile terminal to transmit each hybrid-ARQ message to the base station may be the product of the hybrid-ARQ repetition factor and the TTI duration, and the base station may thus be configured to wait that period of time after each data transmission attempt to a mobile terminal, before engaging in a next data transmission attempt to the mobile terminal.

Figure 4:
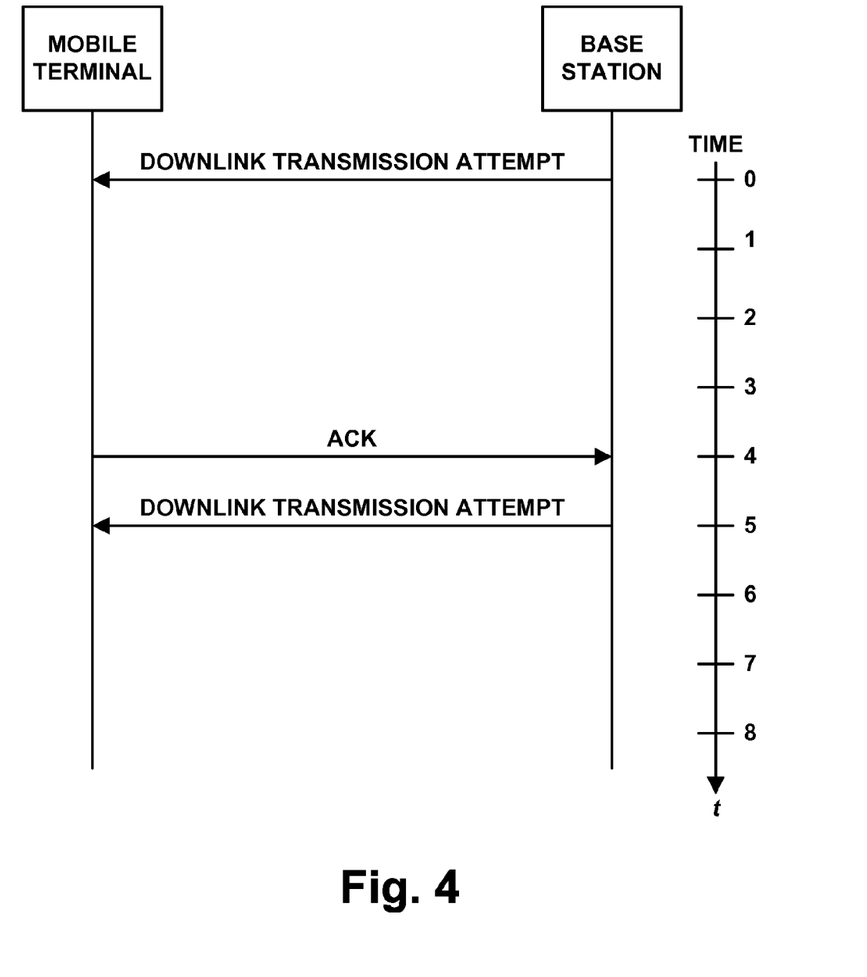
FIG. 4 is a timing diagram depicting timing with use of a hybrid-ARQ repetition factor of 1.
Figure 5:
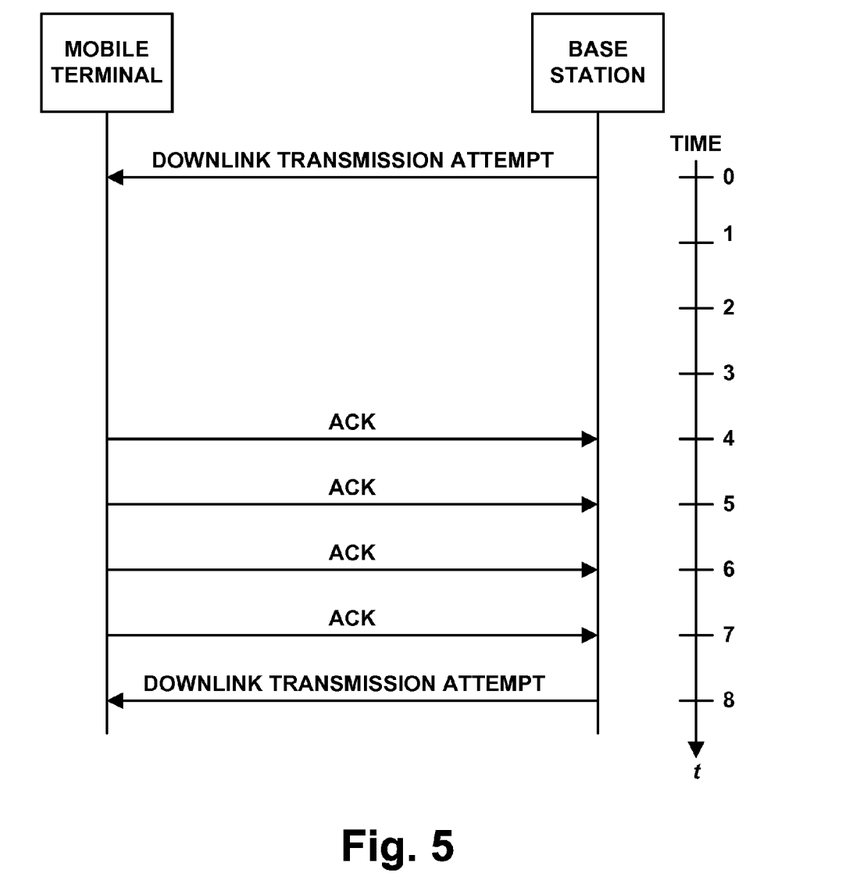
FIG. 5 is a timing diagram depicting timing with use of a hybrid-ARQ repetition factor of 4.

FIGS. 4 and 5 depict how this process may work by way of example from the base station's perspective, showing how the timing may work with different hybrid-ARQ repetition factors. In particular, FIG. 4 depicts the process with a hybrid-ARQ repetition factor of 1, and FIG. 5 depicts the process with a hybrid-ARQ repetition factor of 4.

Each of these figures assumes that the base station engages in a scheduled downlink transmission attempt to the mobile terminal at time t=0 (e.g., subframe 0). Further, each of these figures assumes that the mobile terminal then responsively generates a hybrid-ARQ message, such as an ACK, for the transmission attempt and transmits the hybrid-ARQ message to the base station in a number of consecutive TTIs defined by the hybrid-ARQ repetition factor. Allowing an expected time for the base station's transmission attempt to reach the mobile terminal and for the mobile terminal's first of possibly multiple hybrid-ARQ message transmissions to reach the base station, each figure then assumes that the base station receives the mobile terminal's first hybrid-ARQ message transmission at time t=4 (e.g., subframe 4).

In FIG. 4, with the hybrid-ARQ repetition factor set to 1, as soon as the base station receives the single ACK from the mobile terminal at time t=4, the base station then engages in a next transmission attempt to the mobile terminal at time t=5 (e.g., subframe 5). As discussed above, this low hybrid-ARQ repetition factor thus allows for higher downlink data rate to the mobile terminal.

On the other hand, in FIG. 5, with the hybrid-ARQ repetition factor set to 4, the base station waits a period of four TTIs, possibly receiving the mobile terminal's hybrid-ARQ message in each of the TTIs, before the base station then engages in a next transmission attempt to the mobile terminal at time t=8 (e.g., subframe 8). As discussed above, this high hybrid-ARQ repetition factor may thus result in lower downlink data rate to the mobile terminal, but may have the advantage of freeing up downlink air interface resources during the delay period for use by the base station to schedule transmissions to other mobile terminals.

According to the present method as discussed above, different hybrid-ARQ repetition factors may be defined for use by mobile terminals based on their different subscription service classes, such as based on the PLMNs to which they subscribe, as a way to help provide service differentiation. For instance, mobile terminals in higher priority subscription service classes may be made to use lower hybrid-ARQ repetition factors, whereas mobile terminals in lower priority subscription service classes may be made to use higher hybrid-ARQ repetition factors. Alternatively, reason may exist to provide the opposite differentiation.

Figure 6:
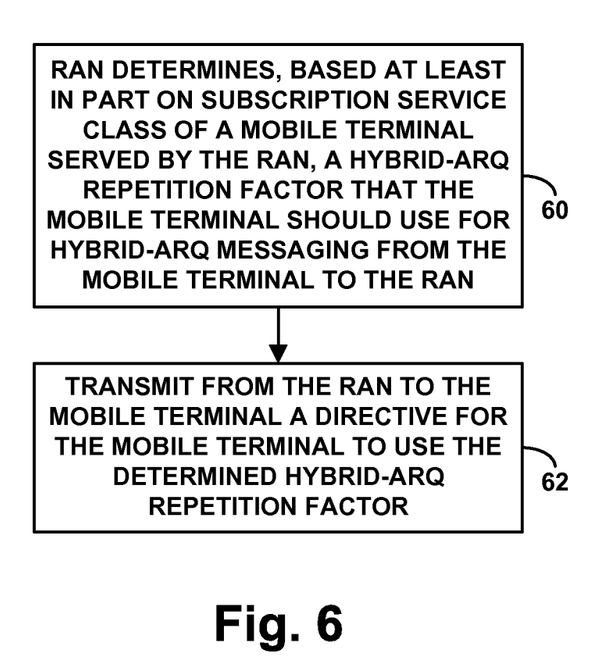
FIG. 6 is a flow chart depicting functions that can be carried out in accordance with the present method.

FIG. 6 is a flow chart depicting example functions of this method, which may be carried out by a RAN as shown in FIG. 1, such as by a base station or other entity of the RAN for instance. The method assumes that the RAN (e.g., base station) serves a particular mobile terminal by way of example, and that the mobile terminal has a particular subscription service class. As shown in FIG. 6, at block 60, the method involves the RAN determining, based at least in part on the subscription service class of the mobile terminal, a hybrid-ARQ repetition factor that the mobile terminal should use for the hybrid-ARQ messaging from the mobile terminal to the RAN. And at block 62, the method then involves transmitting over the air interface from the RAN to the mobile terminal a directive for the mobile terminal to use the determined hybrid-ARQ repetition factor. The mobile terminal may then receive that directive and responsively use the indicated hybrid-ARQ repetition factor.

In this method, the subscription service class of the mobile terminal may take various forms, and the RAN may determine the subscription service class of the mobile terminal in various ways. By way of example, the subscription service class may generally define a service priority level of the mobile terminal, pursuant to a service level subscription agreement with a wireless service provider for instance. In that case, the RAN may determine the subscription service class of the mobile terminal, perhaps during a process of the mobile terminal registering or attaching with the RAN (e.g., with the base station), by receiving from the mobile terminal an identifier of the mobile terminal and consulting a subscription profile record for the identified mobile terminal. Alternatively or additionally, the RAN may determine the subscription service class of the mobile terminal by receiving from the mobile terminal a specification of the mobile terminal's subscription service class or other data indicative of the mobile terminal's subscription service class.

As another example, the subscription service class of the mobile terminal may correspond with a PLMN to which the mobile terminal subscribes. In this regard, each of various wireless service providers may operate one or more PLMNs comprising one or more RANs such as that shown on FIG. 1 and having a respective PLMN identifier, and the mobile terminal may subscribe to the service of such a PLMN. In practice, for instance, a wireless service provider may operate a single PLMN, and the mobile terminal may subscribe to service of that PLMN. Alternatively, a wireless service provider may operate multiple PLMNs, perhaps for different subscription service classes (e.g., one for post-paid subscribers and one for pre-paid subscribers), and the mobile terminal may subscribe to a given one of those PLMNs.

Each base station operated by a wireless service provider may be configured to serve mobile terminals that subscribe to the service of the wireless service provider's PLMN(s) and may be configured with data specifying as a primary PLMN of the base station each such PLMN of the wireless service provider, perhaps along with other data indicating the type of PLMN, such as a corresponding subscription service class (e.g., pre-paid versus post-paid). In addition, pursuant to roaming agreements or the like, various base stations operated by a wireless service provider may be configured to serve mobile terminals that subscribe to service of other wireless service providers' PLMNs, and each of those base stations may be configured with data indicating each such other PLMN as a secondary PLMN of the base station.

Further, each mobile terminal that subscribes to service of a particular PLMN may then similarly be configured with data specifying that PLMN. In that case, the RAN may determine the subscription service class of the mobile terminal, perhaps during a registration or attachment procedure as noted above, by receiving from the mobile terminal a specification of the PLMN to which the mobile terminal subscribes, or by referring to a context record that indicates the mobile terminal's PLMN as provided during registration or attachment or at another time.

Using the mobile terminal's PLMN as an example indication of subscription service class, the RAN may then determine a hybrid-ARQ repetition factor in various ways based at least in part on that PLMN. By way of example, the RAN may make a determination of whether the PLMN to which the mobile terminal subscribes corresponds with the base station serving the mobile terminal, such as whether the mobile terminal's PLMN matches a primary PLMN of the base station. The RAN may then determine, as the hybrid-ARQ repetition factor, a first hybrid-ARQ repetition factor if the determination is that the PLMN to which the mobile terminal subscribes corresponds with the base station. Whereas, the RAN may determine, as the hybrid-ARQ repetition factor, a second hybrid-ARQ repetition factor different than the first hybrid-ARQ repetition factor if the determination is that the PLMN to which the mobile terminal subscribes does not correspond with the base station. In this way, the RAN could select a lower hybrid-ARQ repetition factor for use by a mobile terminal that subscribes to a primary PLMN of the base station and a higher hybrid-ARQ repetition factor for a mobile terminal that subscribes to another PLMN, such as a secondary PLMN and/or a roaming partner's PLMN for instance, or vice versa.

As another example, the RAN may make a determination, based at least in part on the PLMN to which the mobile terminal subscribes, of whether the mobile terminal is a home mobile terminal (e.g., a subscriber to the PLMN of the wireless service provider that operates the base station serving the mobile terminal) or is rather a non-home mobile terminal (e.g., a subscriber to another PLMN, such as a PLMN operated by a roaming partner or by a mobile virtual network operator (MVNO) making use of the service provider's base station). For instance, the RAN may determine whether the PLMN to which the mobile terminal subscribes is a PLMN of the wireless service provider that operates the base station serving the mobile terminal and is thus a home-terminal. The RAN may then determine, as the hybrid-ARQ repetition factor, a first hybrid-ARQ repetition factor if the determination is that the mobile terminal is a home mobile terminal, Whereas, the RAN may determine, as the hybrid-ARQ repetition factor, a second hybrid-ARQ repetition factor different than the first hybrid-ARQ repetition factor if the determination is that the mobile terminal is a non-home mobile terminal. In this way, the RAN could select a lower hybrid-ARQ repetition factor for home-terminals than for non-home terminals, or vice versa.

Still further, as another example, the RAN may make a determination, based at least in part on the PLMN to which the mobile terminal subscribes, of whether the mobile terminal has a pre-paid subscription or rather has a post-paid subscription, such as by consulting data stored by the RAN that indicates whether the mobile terminal's PLMN is one that the wireless service provider operates for post-paid subscribers or rather one that the wireless service provider operates for pre-paid subscribers. The RAN may then determine, as the hybrid-ARQ repetition factor, a first hybrid-ARQ repetition factor if the determination is that the mobile terminal has a pre-paid subscription. Whereas, the RAN may determine, as the hybrid-ARQ repetition factor, a second hybrid-ARQ repetition factor different than the first hybrid-ARQ repetition factor if the determination is that the mobile terminal has a post-paid subscription. In this way, the RAN could select a lower hybrid-ARQ repetition factor for mobile terminals that have post-paid subscriptions than for mobile terminals that have pre-paid subscriptions, or vice versa.

Once the RAN has determined the hybrid-ARQ repetition factor to be used by the mobile terminal, the RAN may then transmitting the directive to the mobile terminal in various ways. By way of example, the RAN may transmit the directive to the mobile terminal in a configuration message that the RAN sends to the mobile terminal in relation to setup of data communication service between the RAN and the mobile terminal. Under the LTE protocol, for instance, the configuration message may be included within an RRC connection setup message or an RRC connection reconfiguration message, in an ackNackRepetition parameter that is part of a physical uplink control channel ConfigDedicated message. Alternatively, the configuration message could be included in a service request response or other message that the base station sends to the mobile terminal.

Although not shown in FIG. 6, the present method may further involve the RAN (e.g., the same base station) also serving another mobile terminal that subscribes to a different PLMN, and the RAN provisioning that other mobile terminal, based at least in part on that other mobile terminal's PLMN, with a different hybrid-ARQ repetition factor. Thus, the RAN may determine, based at least in part on the PLMN to which the other mobile terminal subscribes, a hybrid-ARQ repetition factor that the other mobile terminal should use for hybrid-ARQ messaging from the other mobile terminal to the RAN, and the RAN may transmit over the air interface to the other mobile terminal a directive for the other mobile terminal to use the determined hybrid-ARQ repetition factor. In practice, then, as the RAN serves different mobile terminals that subscribe to different PLMNs, the RAN may provision the mobile terminals to use different hybrid-ARQ repetition factors.

The RAN may be arranged to carry out the present method generally whenever the RAN serves a mobile terminal, and/or specifically in response to one or more trigger conditions or events. Without limitation, an example condition may be the existence of threshold congestion on the air interface, as the existence of a congested air interface may provide a good basis to engage in service differentiation by assigning mobile terminals of different subscription service classes to use different hybrid-ARQ repetition factors. The RAN may detect threshold congestion on the air interface in various ways, such as by determining that at least a predefined threshold percentage of downlink timeslots are or have been scheduled to carry data to mobile terminals, and/or by determining that at least a predefined threshold number of mobile terminals are currently registered for service on the air interface and/or are currently operating in an active and/or connected mode on the air interface. Responsive to detecting such congestion, the RAN may then carry out the determining and transmitting functions depicted in FIG. 6.

Although the foregoing description is focused mainly on having a RAN dynamically provision a mobile terminal to use a particular hybrid-ARQ repetition factor selected by the RAN based at least in part on the mobile terminal's subscription service class (e.g., PLMN), another implementation of the present method may involve the RAN specifying various hybrid-ARQ repetition factors per subscription service class, and mobile terminals then determine which hybrid-ARQ repetition factors to use based on their subscription service class. An example of this method is illustrated by FIG. 7, which assumes again for example that a RAN serves a mobile terminal and that the mobile terminal subscribes to service of a particular PLMN.

Figure 7:
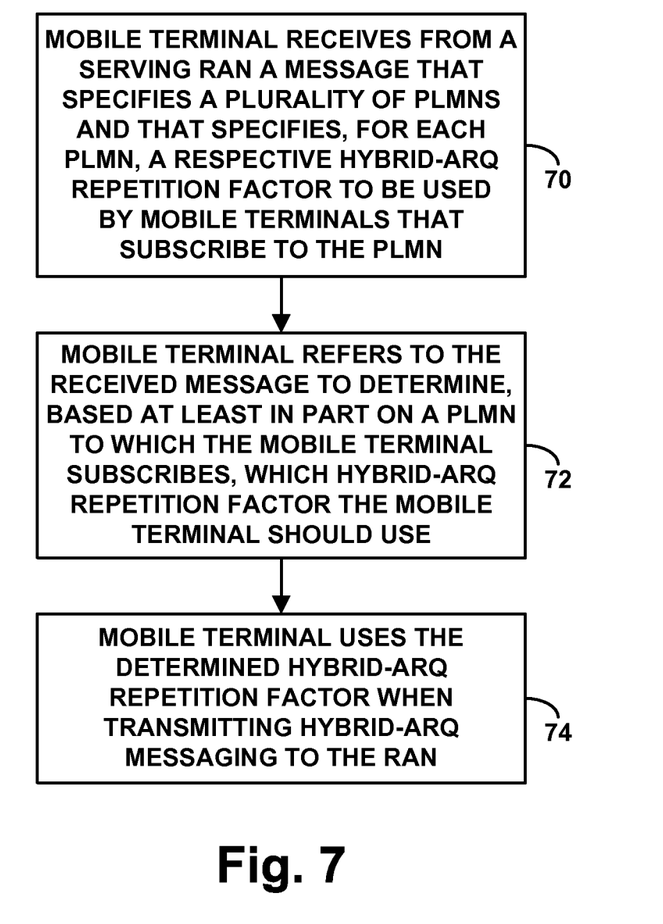
FIG. 7 is another flow chart depicting functions that can be carried out in accordance with the present method.

As shown in FIG. 7, at block 70, the method involves the mobile terminal receiving over the air interface from the RAN a message that specifies a plurality of PLMNs and that specifies, for each PLMN, a respective hybrid-ARQ repetition factor to be used by mobile terminals that subscribe to the PLMN. By way of example, the RAN may broadcast such a message as overhead information on a control channel of the air interface, such as in a master information block, system parameter message, or the like, and the mobile terminal may receive and read the message. Alternatively, the RAN may transmit the message to the mobile terminal as a configuration message like that described above, and the mobile terminal may thus receive the message during setup of communication service over the air interface between the mobile terminal and the RAN. In an example implementation, the message may take the form of a table that lists PLMNs and that specifies for each PLMN a corresponding hybrid-ARQ factor, optimally specifying for different PLMNs different corresponding hybrid-ARQ factors.

At block 72, the mobile terminal may then refer to the received message to determine, based at least in part on the particular PLMN to which the mobile terminal subscribes, which hybrid-ARQ repetition factor the mobile terminal should use, i.e., which hybrid-ARQ repetition factor the message specifies to be used by mobile terminals that subscribe to that PLMN. And at block 74, the mobile terminal may then use the determined hybrid-ARQ repetition factor when transmitting hybrid-ARQ messaging to the RAN.

Exemplary embodiments have been described above. It should be understood, however, that variations from these embodiments are possible, while remaining within the true spirit and scope of the invention.

We claim:

1. In a wireless communication system in which a radio access network (RAN) serves a mobile terminal over an air interface defining a downlink for carrying data transmissions from the RAN to the mobile terminal and an uplink for carrying hybrid-ARQ messaging from the mobile terminal to the RAN, and wherein the mobile terminal has a particular subscription service class, a method comprising:
   receiving by the mobile terminal over the air interface from the RAN a message that specifies a plurality of subscription service classes and that specifies, for each subscription service class, a respective hybrid-ARQ repetition factor to be used by mobile terminals that have the subscription service class;
   referring by the mobile terminal to the received message to determine, based at least in part on the particular subscription service class of the mobile terminal, which hybrid-ARQ repetition factor the mobile terminal should use; and
   using by the mobile terminal the determined hybrid-ARQ repetition factor when transmitting hybrid-ARQ messaging to the RAN,
   wherein for each of a plurality of data transmissions from the RAN to the mobile terminal, the mobile terminal transmits to the RAN a hybrid-ARQ message selected from the group consisting of a positive acknowledgement (ACK) and a negative acknowledgement (NAK), and wherein the determined hybrid-ARQ repetition factor defines how many times to transmit the hybrid-ARQ message for each such data transmission.

2. The method of claim 1, wherein (i) if the subscription service class is a first subscription service class, then the determined hybrid-ARQ factor is a first hybrid-ARQ factor, and (ii) if the subscription service class is a second subscription service class different than the first subscription service class, then the determined hybrid-ARQ factor is a second hybrid-ARQ factor different than the first hybrid-ARQ factor.

3. The method of claim 1, wherein the particular subscription service class of the mobile terminal is a particular public land mobile network (PLMN) to which the mobile terminal subscribes, wherein the subscription service classes specified by the message are PLMNs, and wherein determining the hybrid-ARQ repetition factor based at least in part on the subscription service class of the mobile terminal comprises determining the hybrid-ARQ repetition factor based at least in part on the PLMN to which the mobile terminal subscribes.

4. The method of claim 3, wherein (i) if the PLMN to which the mobile terminal subscribes is a first PLMN, then the determined hybrid-ARQ factor is a first hybrid-ARQ factor, and (ii) if the PLMN to which the mobile terminal subscribes is a second PLMN different than the first PLMN, then the determined hybrid-ARQ factor is a second hybrid-ARQ factor different than the first hybrid-ARQ factor.

5. The method of claim 1, wherein the subscription service class is selected from the group consisting of pre-paid and post-paid, wherein (i) if the subscription service class is pre-paid, then the determined hybrid-ARQ repetition factor is a first hybrid-ARQ repetition factor, and (ii) if the subscription service class is post-paid, then the determined hybrid-ARQ repetition factor is a second hybrid-ARQ repetition factor different than the first hybrid-ARQ repetition factor.

6. The method of claim 1, wherein the subscription service class is selected from the group consisting of home and non-home, wherein (i) if the subscription service class is home, then the determined hybrid-ARQ repetition factor is a first hybrid-ARQ repetition factor, and (ii) if the subscription service class is non-home, then the determined hybrid-ARQ repetition factor is a second hybrid-ARQ repetition factor different than the first hybrid-ARQ repetition factor.

7. The method of claim 1, wherein receiving the message occurs during setup of communication service between the mobile terminal and the RAN.

8. A mobile terminal having a particular subscription service class and comprising:
   a wireless communication interface for engaging in communication with a base station;
   a processor;
   data storage; and
   program instructions stored in the data storage and executable by the processor to implement mobile terminal operations comprising:
   receiving from the base station a message that specifies a plurality of subscription service classes and that specifies, for each subscription service class, a respective hybrid-ARQ repetition factor corresponding with the subscription service class;
   referring to the received message to determine, based at least in part on the particular subscription service class of the mobile terminal, which hybrid-ARQ repetition factor the mobile terminal should use; and
   using the determined hybrid-ARQ repetition factor when transmitting hybrid-ARQ messaging to the base station,
   wherein for each of a plurality of data transmissions from the base station to the mobile terminal, the mobile terminal transmits to the base station a hybrid-ARQ message selected from the group consisting of a positive acknowledgement (ACK) and a negative acknowledgement (NAK), and wherein the hybrid-ARQ repetition factor defines how many times to transmit the hybrid-ARQ message for each such data transmission.

9. The mobile terminal of claim 8, wherein (i) if the subscription service class is a first subscription service class, then the determined hybrid-ARQ factor is a first hybrid-ARQ factor, and (ii) if the subscription service class is a second subscription service class different than the first subscription service class, then the determined hybrid-ARQ factor is a second hybrid-ARQ factor different than the first hybrid-ARQ factor.

10. The mobile terminal of claim 8, wherein the particular subscription service class of the mobile terminal is a particular public land mobile network (PLMN) to which the mobile terminal subscribes, wherein the subscription service classes specified by the message are PLMNs, and wherein determining the hybrid-ARQ repetition factor based at least in part on the subscription service class of the mobile terminal comprises determining the hybrid-ARQ repetition factor based at least in part on the PLMN to which the mobile terminal subscribes.

11. The mobile terminal of claim 10, wherein (i) if the PLMN to which the mobile terminal subscribes is a first PLMN, then the determined hybrid-ARQ factor is a first hybrid-ARQ factor, and (ii) if the PLMN to which the mobile terminal subscribes is a second PLMN different than the first PLMN, then the determined hybrid-ARQ factor is a second hybrid-ARQ factor different than the first hybrid-ARQ factor.

12. The mobile terminal of claim 10, wherein the mobile terminal is configured with data specifying the PLMN to which the mobile terminal subscribes.

13. The mobile terminal of claim 8, wherein the subscription service class is selected from the group consisting of pre-paid and post-paid, wherein (i) if the subscription service class is pre-paid, then the determined hybrid-ARQ repetition factor is a first hybrid-ARQ repetition factor, and (ii) if the subscription service class is post-paid, then the determined hybrid-ARQ repetition factor is a second hybrid-ARQ repetition factor different than the first hybrid-ARQ repetition factor.

14. The mobile terminal of claim 8, wherein the subscription service class is selected from the group consisting of home and non-home, wherein (i) if the subscription service class is home, then the determined hybrid-ARQ repetition factor is a first hybrid-ARQ repetition factor, and (ii) if the subscription service class is non-home, then the determined hybrid-ARQ repetition factor is a second hybrid-ARQ repetition factor different than the first hybrid-ARQ repetition factor.

* * * * *